United States Patent [19]
Oulton

[11] 3,776,491
[45] Dec. 4, 1973

[54] AIRCRAFT WITH COMPOUND WING

[76] Inventor: Robert F. Oulton, 1908 Sands Dr., Annapolis, Md.

[22] Filed: June 25, 1971

[21] Appl. No.: 156,798

[52] U.S. Cl. .................. 244/42 CB, 244/42 DC
[51] Int. Cl. ................................. B64c 9/20
[58] Field of Search ............ 244/45, 43, 41, 42 DC, 244/42 DA, 42 DB, 42 CB

[56] References Cited
UNITED STATES PATENTS

| | | | |
|---|---|---|---|
| 2,275,777 | 3/1942 | Lane et al. ........................ | 244/43 |
| 2,148,962 | 2/1939 | Potoczek .......................... | 244/43 |
| 2,279,615 | 4/1942 | Bugatti ........................ | 244/42 DC |
| 2,317,267 | 4/1943 | Gazda ............................. | 244/43 |
| 3,578,266 | 5/1971 | Upton ........................... | 244/43 R |

*Primary Examiner*—Milton Buchler
*Assistant Examiner*—Carl A. Rutledge
*Attorney*—Ralph L. Thomas et al.

[57] ABSTRACT

An aircraft is provided with a compound wing which includes a main wing with one or more auxiliary wings. The auxiliary wings are attached to the main wing by positioning means which may be operated to selectively vary the location of the auxiliary wings with respect to the main wing thereby to vary the chord or the span of the compound wing. The auxiliary wing may also be located with respect to the main wing to provide a Venturi effect therebetween to increase the lift of the compound wing. An aircraft with compound wings has variable lift capability which lends versatility for various flight requirements. The compound wing effectively increases air safety and reduces noise, gas, smoke, and particle pollution around airports and enroute.

23 Claims, 32 Drawing Figures

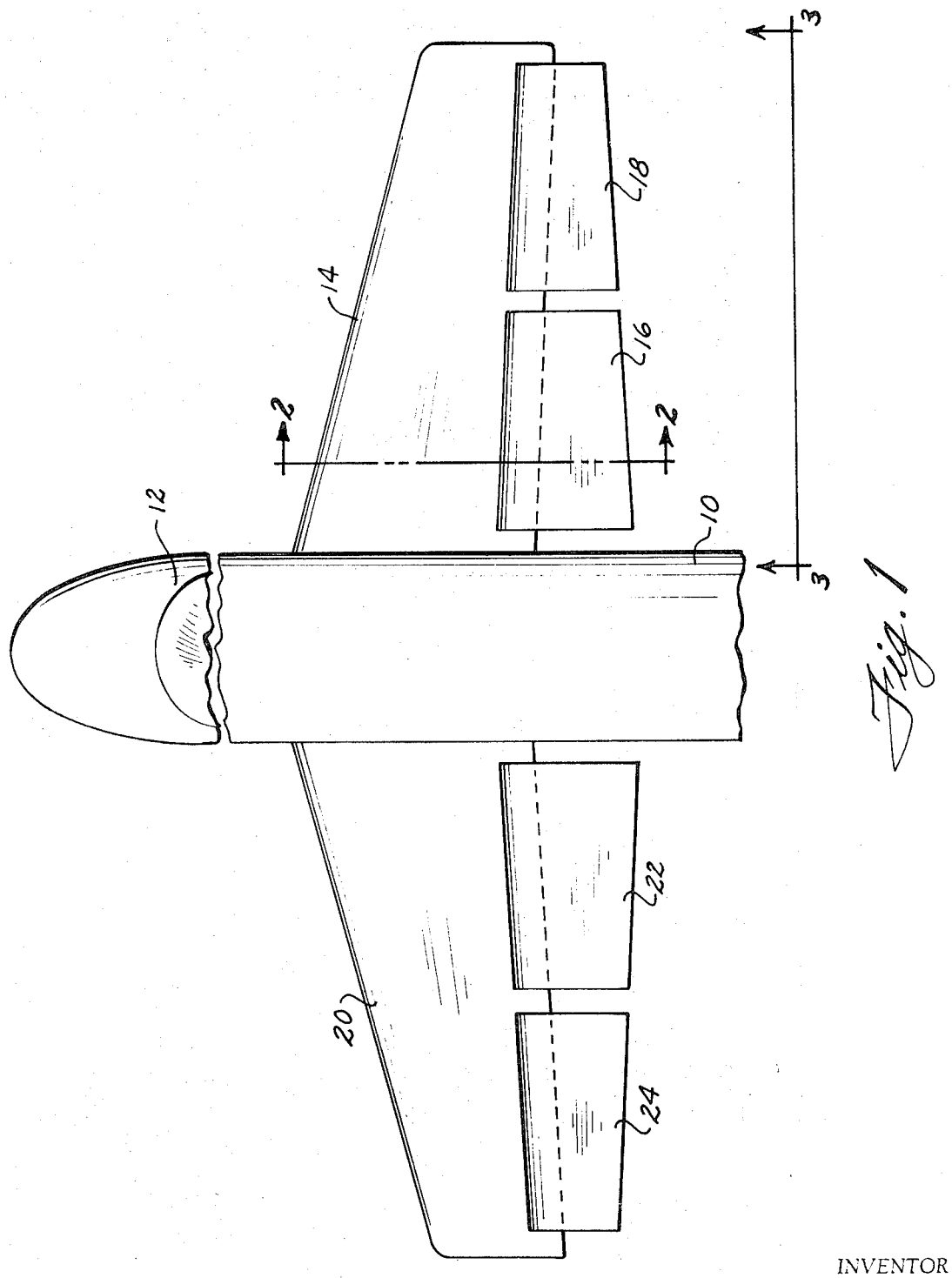

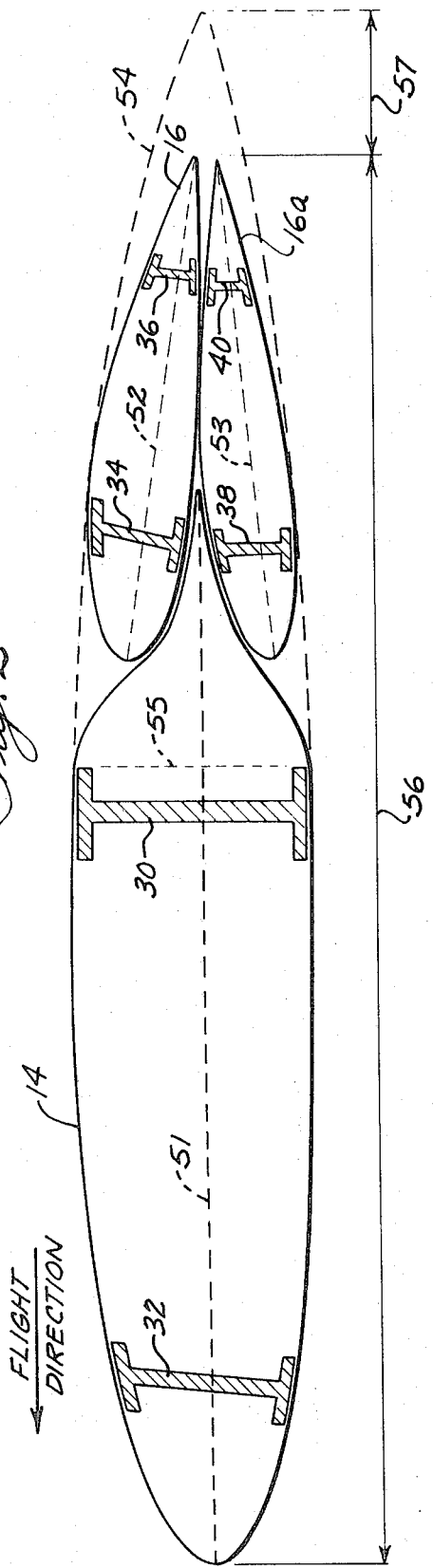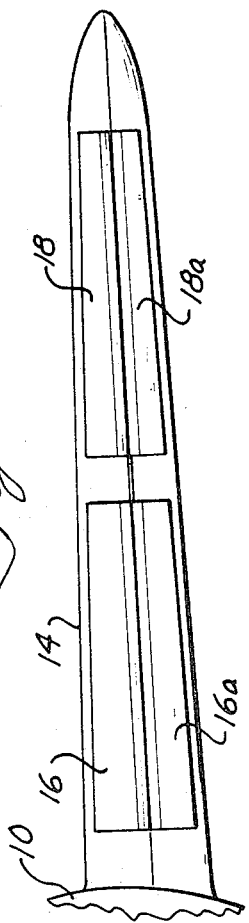

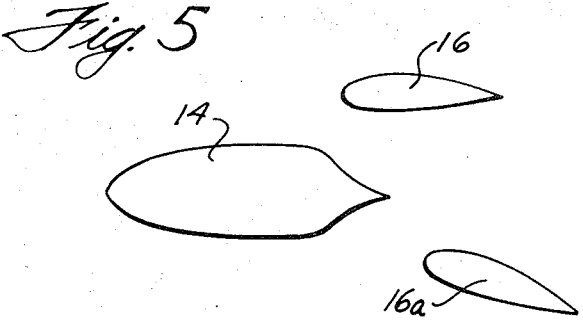
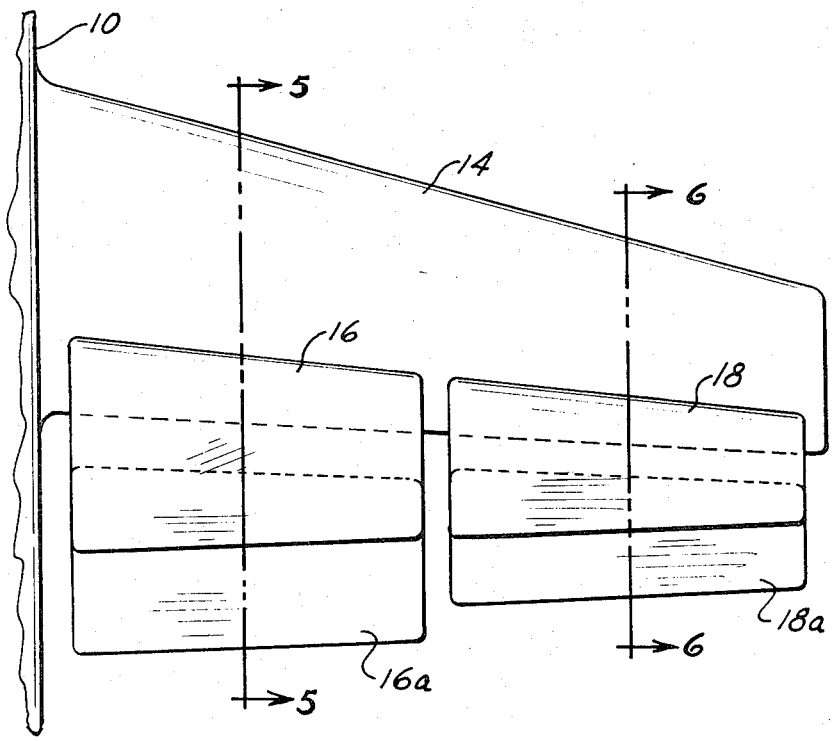
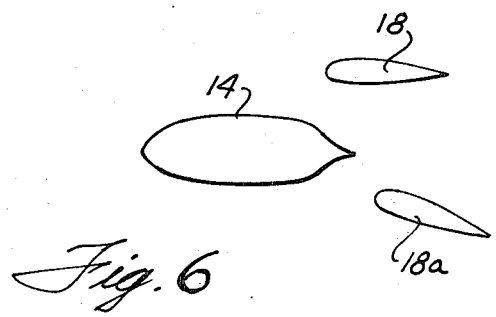

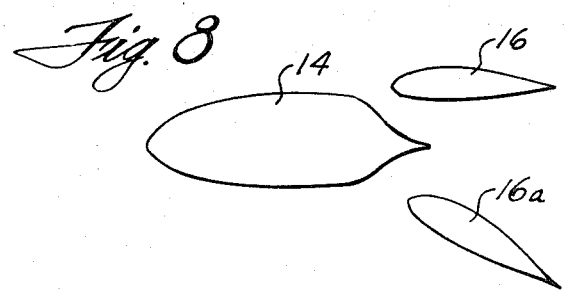
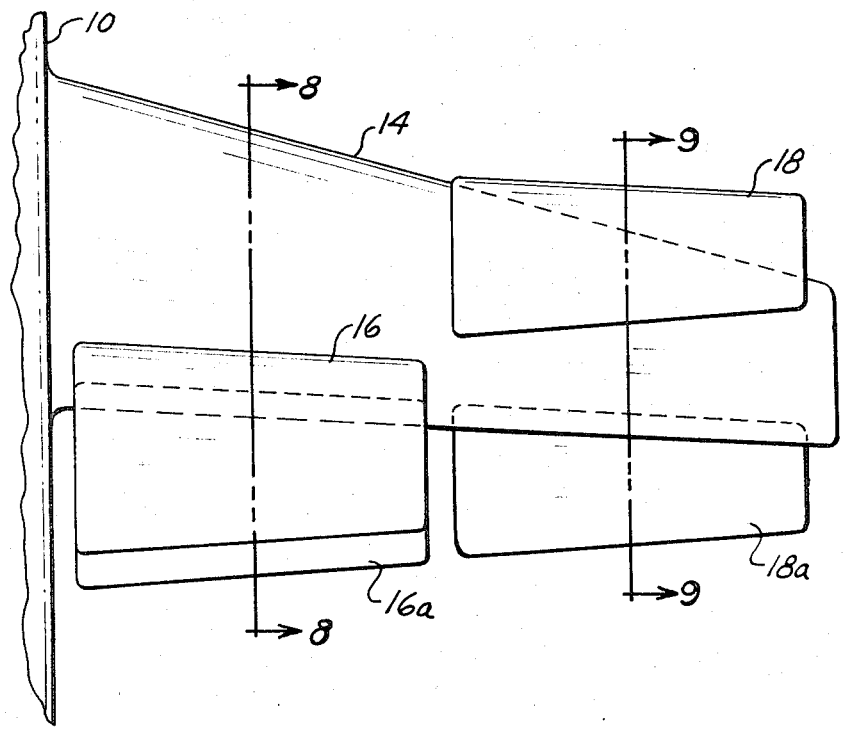
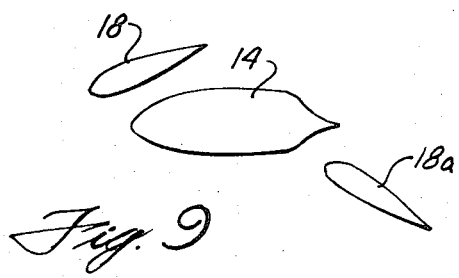

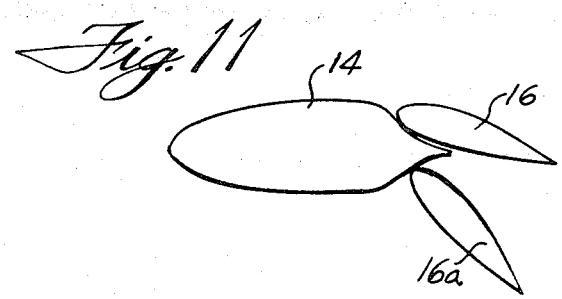
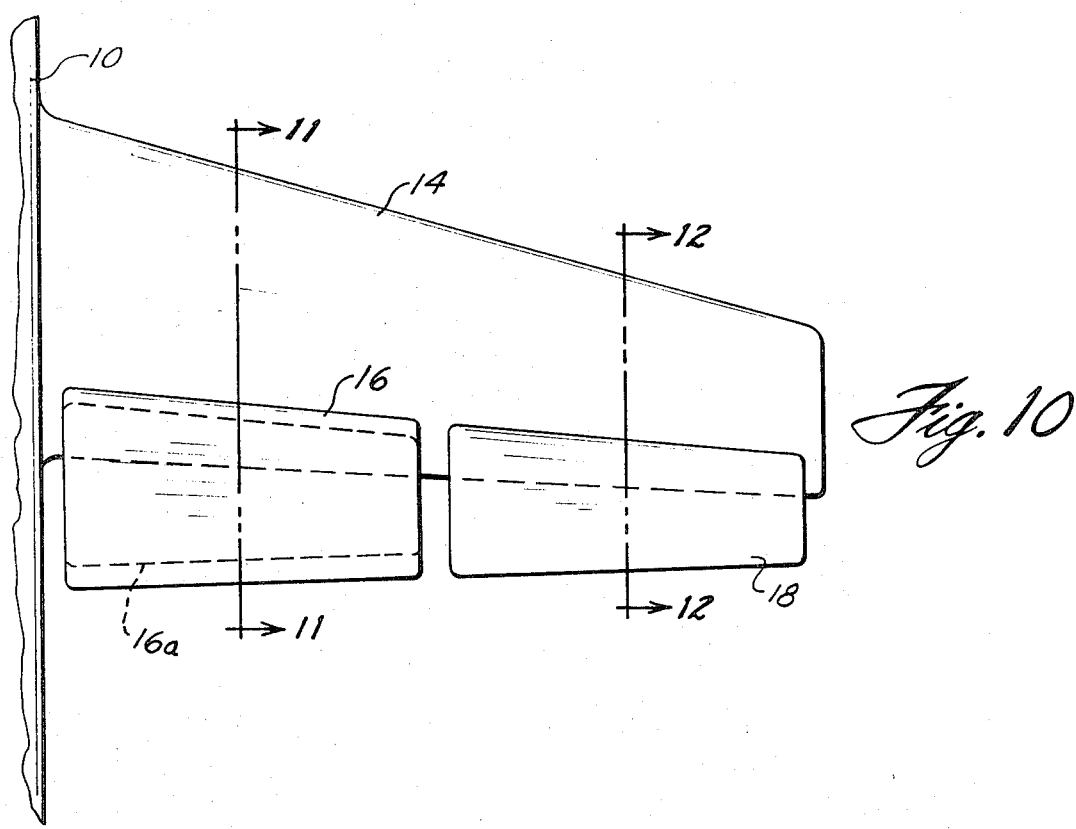
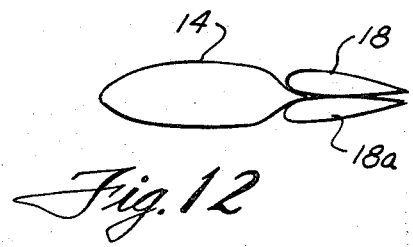

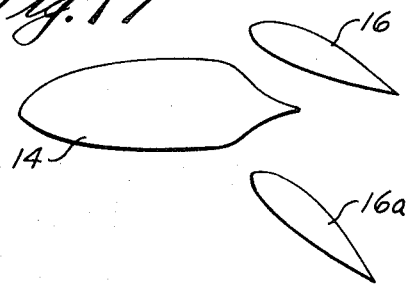
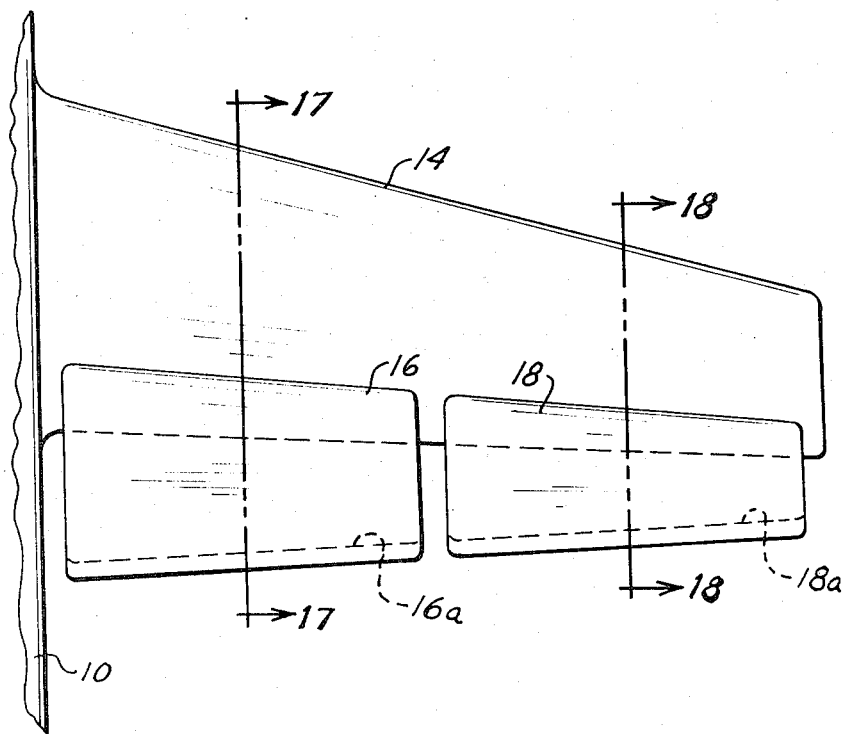
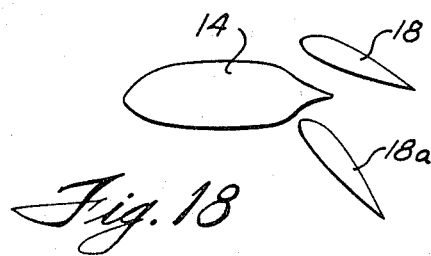

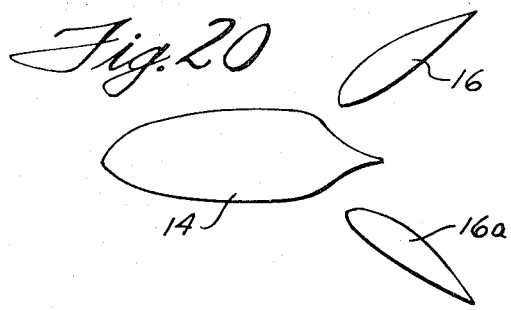
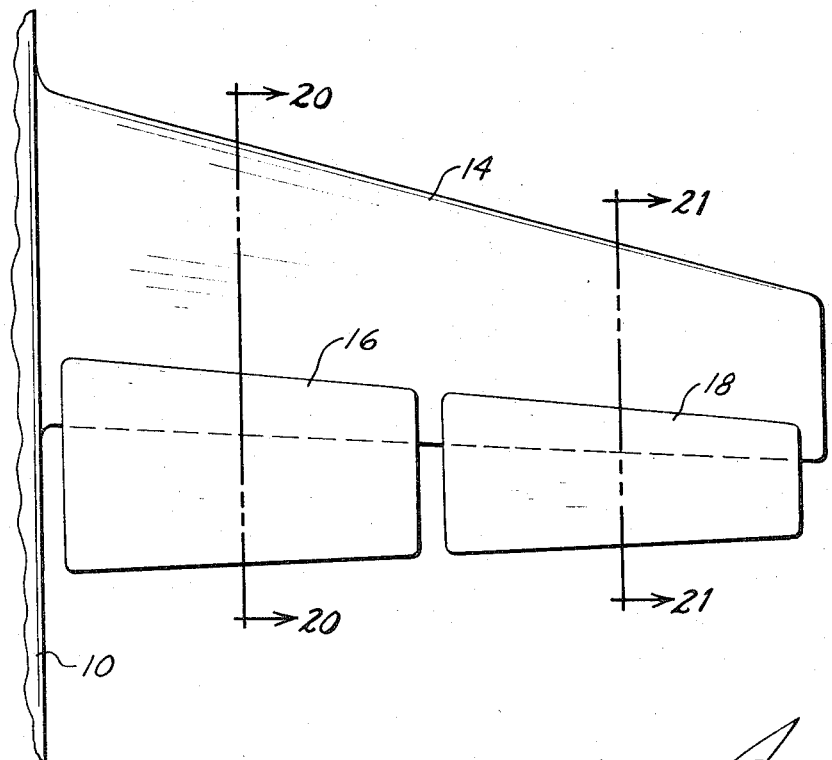
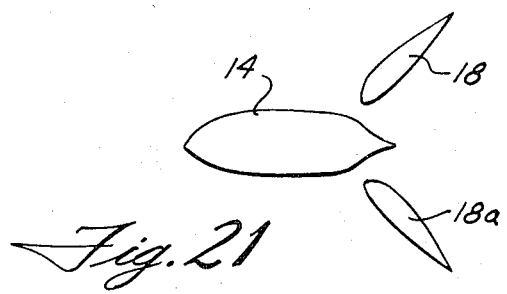

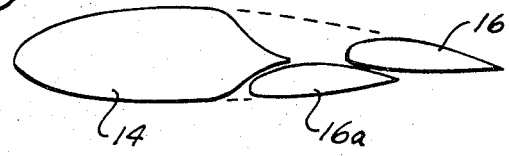
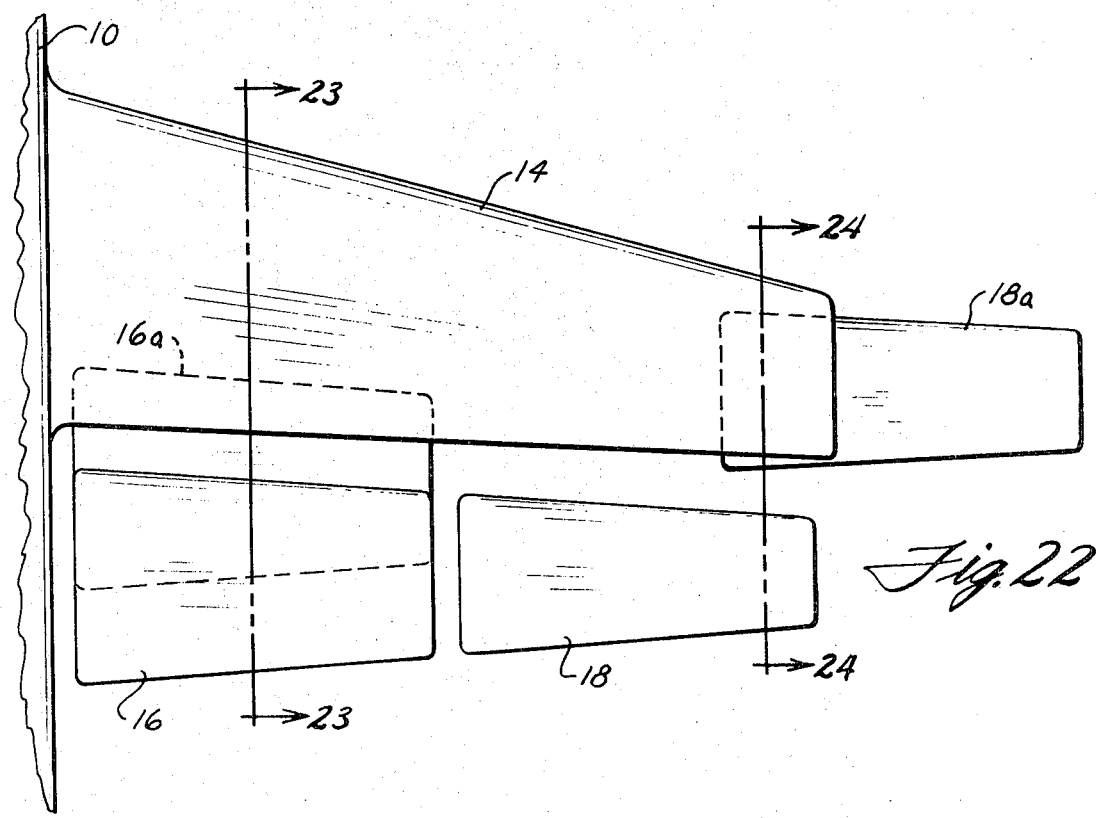
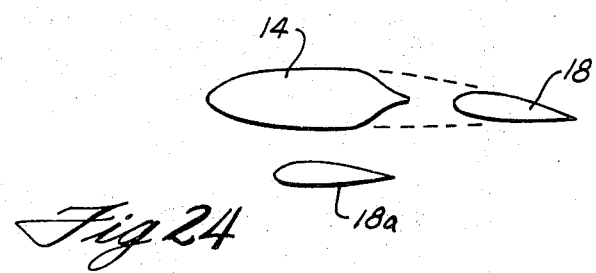

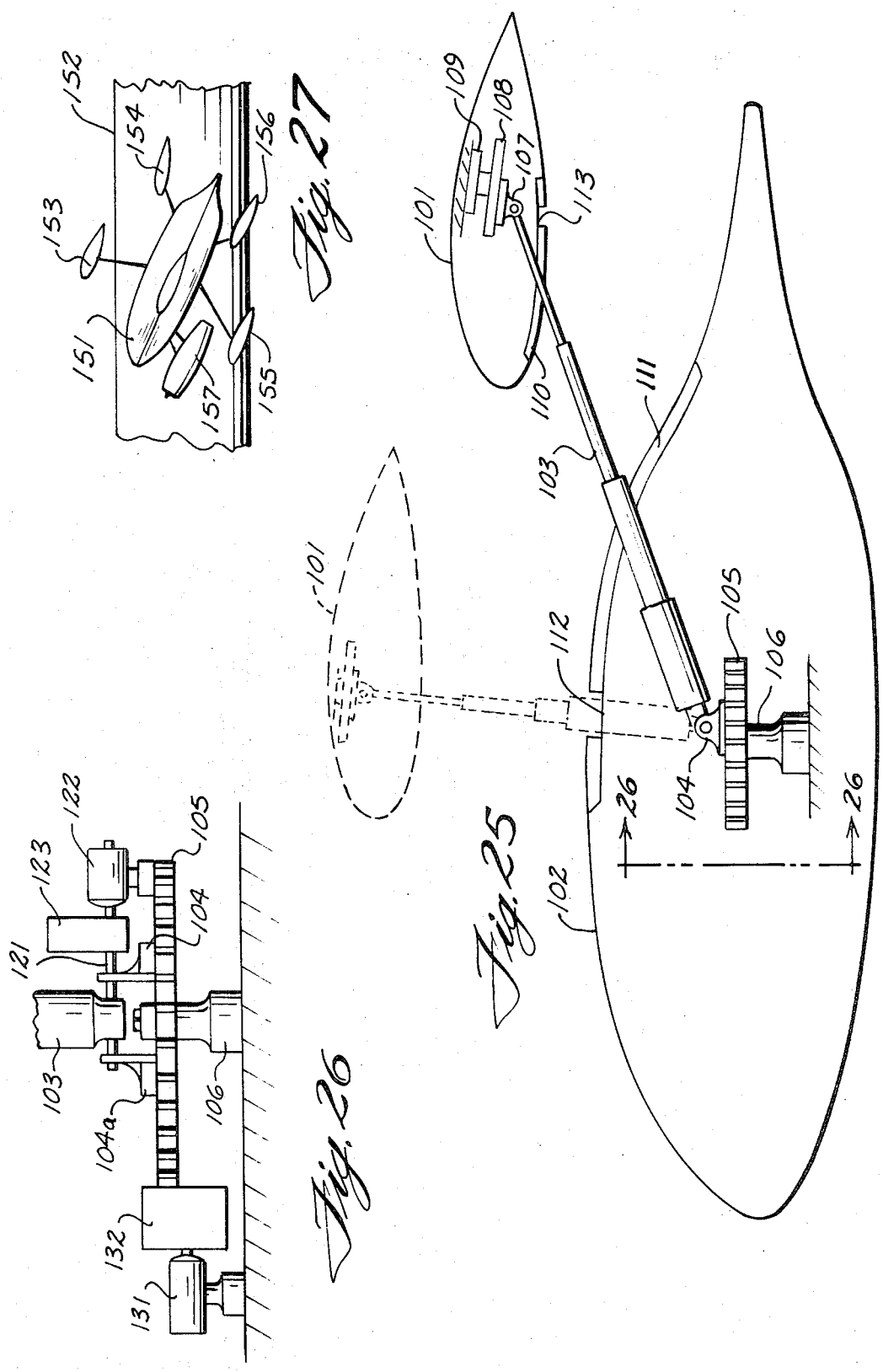

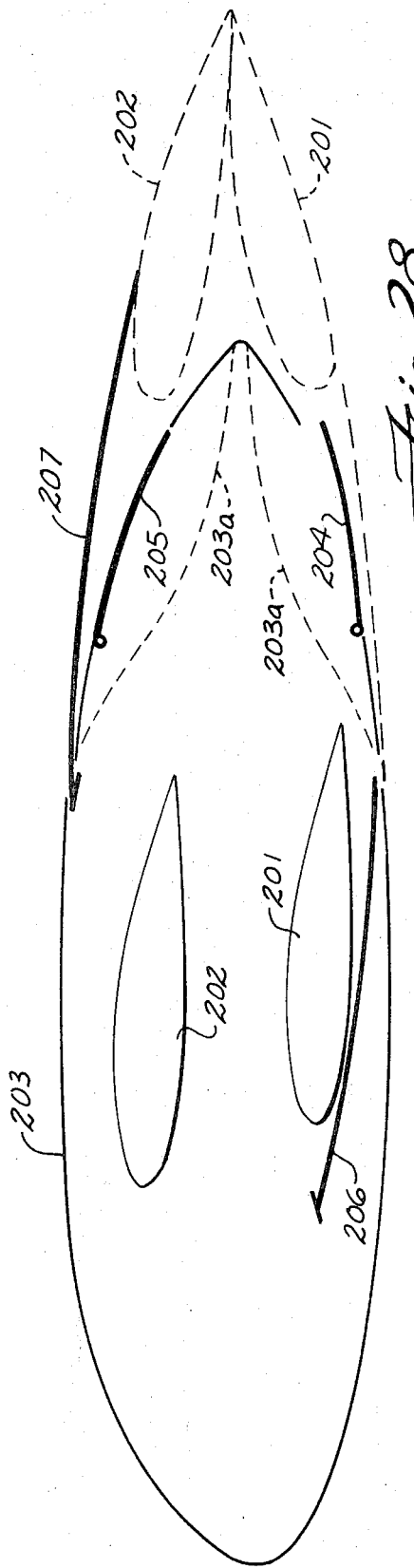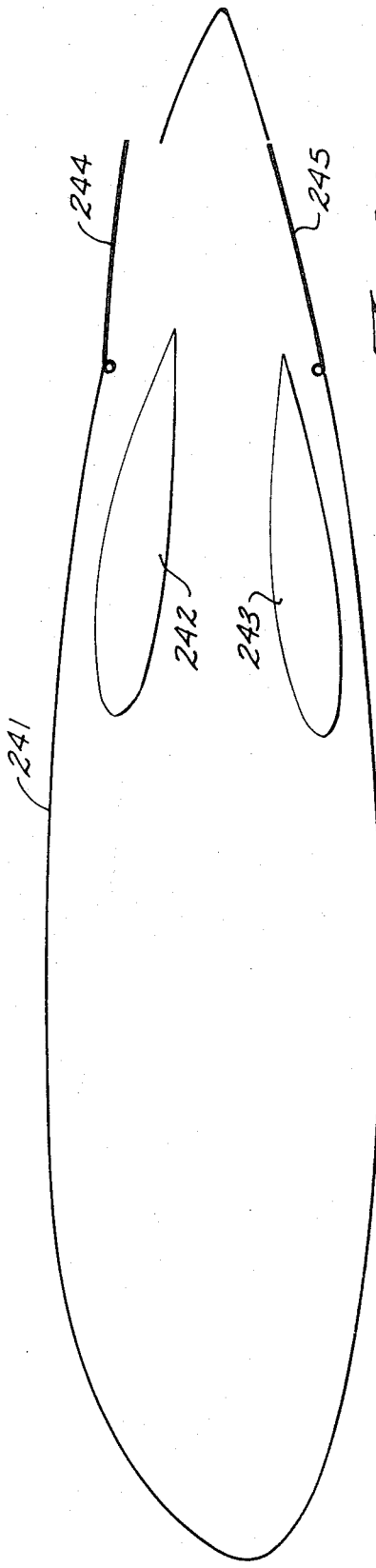

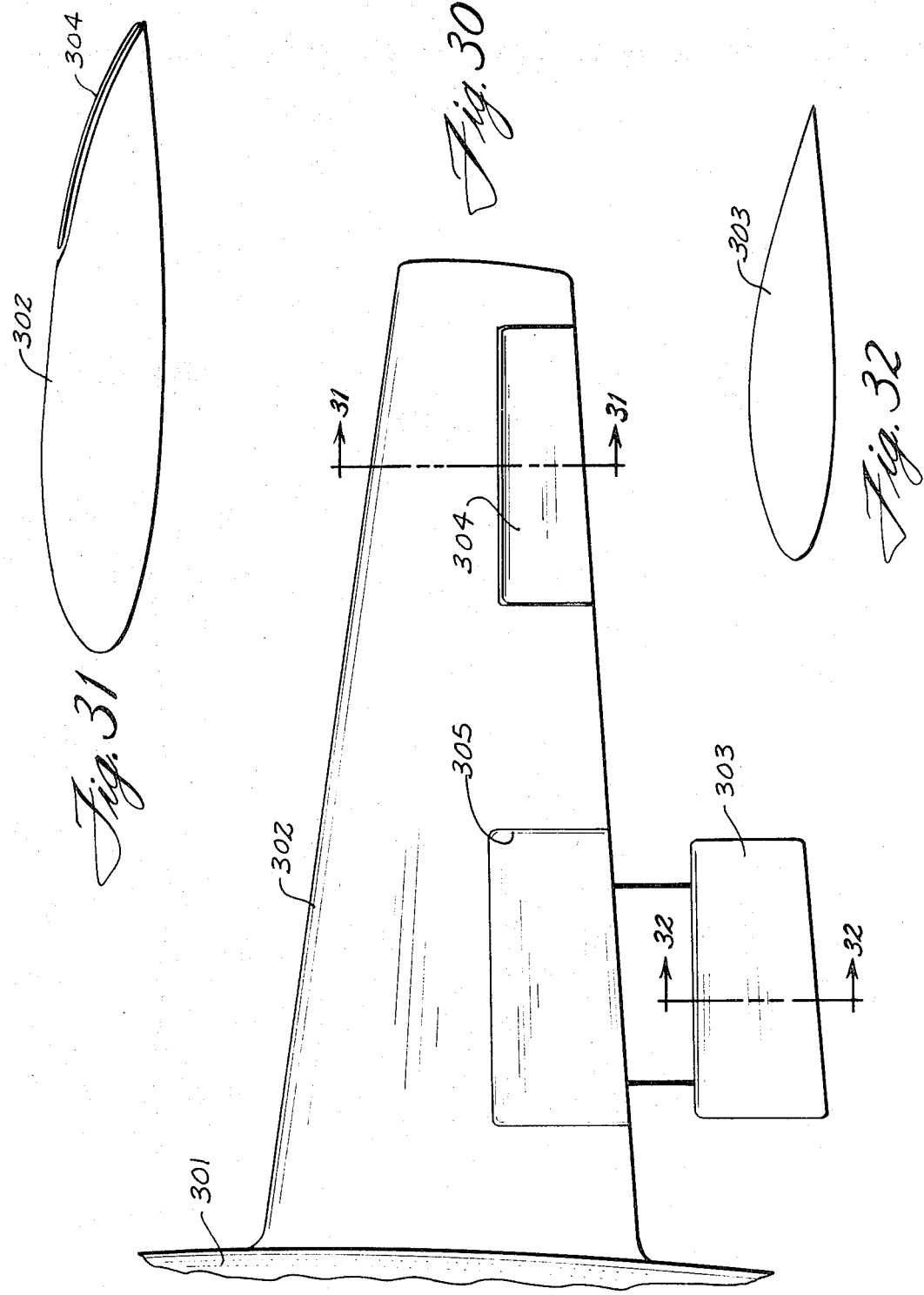

AIRCRAFT WITH COMPOUND WING

BACKGROUND OF THE INVENTION

1. This invention relates to aircraft and more particularly to an improved wing for aircraft.

2. In the first few decades of powered flight, multi-wing aircraft, mostly biplanes, predominated. The multi-wing aircraft outnumbered the monoplanes because the heavy materials required to build a monoplane with the comparable lift of a biplane were relatively very expensive, if available. Engines powerful enough to operate a heavy monoplane were relatively much more expensive than the low powered engines which were adequate for a lighter biplane. In the early decades of powered flight airports were inadequate or non-existent. The biplane could land more safely since it landed at relatively much lower speeds than the monoplane, and the biplane required relatively much less runway.

As more powerful engines later became available, permitting progressively higher flight speeds, the multi-wing aircraft with external struts, guys, and the like suffered excessive drag at higher speeds. At this point the monoplane with the more powerful engine provided higher flight speeds with much less drag than the multi-wing aircraft, and the monoplane began to dominate the aviation industry. The first era of the multi-wing aircraft as a STOL aircraft became passe.

High powered aircraft capable of flight speeds six to 20 times their stalling speeds were introduced into commercial and military aviation during the past 25 years at tremendous costs. Wing loadings surpassed that of all earlier aircraft. As such aircraft became heavier, stalling speeds increased, and longer runways became necessary. The cost of longer runways and the cost of ground support facilities increased commensurately for such aircraft. Moreover, the cost of such aircraft approached excessive limits. One approach to reducing the need for long and expensive runways has been the STOL (Short TakeOff and Landing) aircraft and the VTOL (Vertical TakeOff and Landing) aircraft which do not require the expensive long runways. The cost, however, of the STOL and VTOL aircraft continues to be prohibitive for efficient commercial and most military operations. There is a need for a multi-purpose aircraft which permits selectively combining the desired lift characteristics provided by the earlier biplane with the speed capabilities provided by modern day monoplanes. In essence the need exists for a versatile aircraft, one which permits greater efficiency across a wide range of different aeronautical requirements, and for this purpose a wing adaptable to various flight conditions and loadings is desired. It is to this end that the present invention is directed.

SUMMARY OF THE INVENTION

It is a feature of this invention to provide a versatile aircraft which may vary selectively the lift capability of the wing to permit changes in the stalling speed, cruising speed, altitude and other parameters of a given flight.

It is a feature of this invention to provide a flexible aircraft which uses auxiliary wings selectively deployed to vary the lift capability of an aircraft whereby the parameters of range, speed, and altitude may be changed to follow a given flight envelope with optimum efficiency.

It is a feature of this invention to provide an improved wing construction including a main wing having one or more auxiliary wings which may be selectively deployed.

It is another feature of this invention to provide a compound wing including a main wing and one or more auxiliary wings wherein the compound wing may be rotated with respect to the transverse axis of an aircraft fuselage.

It is another feature of this invention to provide an improved aircraft having a compound wing composed of a main wing with one or more auxiliary wings which selectively may be deployed to increase the span of the compound wing.

It is a further feature of this invention to provide an aircraft with a compound wing composed of a main wing with one or more auxiliary wings which may be deployed to provide the aircraft with the ability (1) to land or to take off using short runways and (2) to approach a runway or to climb out from a runway at high angles with respect to the runway.

It is a further feature of this invention to provide an aircraft with a compound wing including a main wing and one or more auxiliary wings which may be deployed whereby the aircraft may land or take off vertically from an airport.

It is another feature of this invention to provide an aircraft with a compound wing including a main wing and one or more auxiliary wings which may be deployed to provide the aircraft with the capability of minimizing noise and air pollution on and around airports.

It is a feature of this invention to provide an aircraft with a compound wing including a main wing and one or more auxiliary wings which may be deployed or retracted in flight thereby to vary the chord of the compound wing selectively to provide variable lift as needed.

In one arrangement according to this invention a compound wing is provided which includes a main wing having a surface that provides lift in response to airflow thereacross and one or more auxiliary wings each of which has a surface which responds to airflow thereacross to provide lift. A variable strut arrangement connects the auxiliary wings to the main wing which selectively positions the auxiliary wings in any one of a plurality of positions with respect to the main wing. The auxiliary wings may be housed within the main wing when not in use, or the auxiliary wings may be housed on the outer surface of the main wing to provide lift when housed. The after outer surface of the main wing may be truncated and contoured to receive the auxiliary wings when housed. The auxiliary wings may be deflatable if desired. The compound wing may be rotatable with respect to the transverse axis of the aircraft fuselage.

A compound wing which is rotatable with respect to the transverse axis of the fuselage provides several advantages. For vertical or short field takeoff or landing of an aircraft the compound wing may be rotated to direct the leading edge of the compound wing upwardly thereby to direct the thrust downwardly from wing mounted jet engines. The rotation of the compound wing upwardly with respect to the fuselage during the climbing and descending portions of a flight increases pilot vision by maintaining the fuselage substantially horizontal, and passenger and pilot comfort is increased because vertical G forces are substantially eliminated. The reduction of such G forces reduces the stress on cargo and the aircraft structure. Further, a tiltable compound wing reduces the length of the landing gear assemblies used by many types of aircraft which heretofore required relatively long landing gear assemblies to permit lowering the tail of the fuselage to flare out an approach to landing, or to rotate the nose upwardly at takeoff. Such landing gear assemblies are necessary to permit sufficient elevation of the nose of the aircraft without dragging the tail on the runway. When the size of the landing gear assembly is reduced, the aircraft rests closer to the ground, and this is useful when loading or unloading passengers or cargo. If the rotatable wing is adjusted to direct upwardly the exhaust of wing mounted jet engines when the aircraft is in an airport, passengers and cargo may be loaded or unloaded without shutting down the engines. Also, the engines are easily accessible to maintenance personnel whereby maintenance procedures and adjustments may be made on the engines thus positioned while they are running.

Moreover, by rotating a compound wing to direct engine exhaust downwardly during takeoff or landing, during climbout after takeoff, or during approaches for landing, the cone of adversely directed noise and exhaust emissions may be minimized. The noise emissions from an aircraft near the ground are concentrated into a controllable area, and as the exhaust of the engine is rotated downwardly toward the vertical, the area of noise pollution on the ground is reduced, thereby sparing the surrounding population from excessive noise. Further, the rapid ascent to and descent from high levels above airports, where the populace is hardly aware of the presence of aircraft, reduces the time of ground pollution. The deployment of a tiltable compound wing to provide maximum additional lift during takeoff and landing minimizes power consumption thereby reducing the quantity of gas, smoke, and particles emitted into the lower atmosphere surrounding an airport. Such pollution is minimized also in the higher altitudes enroute by tilting the compound wing to provide superior lift capabilities over the conventional fixed purpose type wing thereby resulting in less fuel consumption which thereby reduces pollution.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 1 is a plan view of an aircraft with a compound wing according to this invention.

FIG. 2 is a cross sectional view taken on the line 2—2 in FIG. 1.

FIG. 3 is a rear elevation view taken on the line 3—3 in FIG. 1.

FIG. 4 is a plan view of a compound wing with the auxiliary wings deployed for climbing from or gliding to a short runway.

FIG. 5 is a cross sectional view of a compound wing taken on the line 5—5 in FIG. 4.

FIG. 6 is a cross sectional view of a compound wing taken on the line 6—6 in FIG. 4.

FIG. 7 is a plan view of a compound wing with the auxiliary wings deployed for rolling down a short runway prior to takeoff.

FIG. 8 is a cross sectional view of the compound wing taken on the line 8—8 in FIG. 7.

FIG. 9 is a cross sectional view of the compound wing taken on the line 9—9 in FIG. 7.

FIG. 10 is a plan view of a compound wing with the auxiliary wings deployed for takeoff or landing using a long runway.

FIG. 11 is a cross sectional view of the compound wing taken on the line 11—11 in FIG. 10.

FIG. 12 is a cross sectional view of the compound wing taken on the line 12—12 in FIG. 10.

FIG. 16 is a plan view of the compound wing with the auxiliary wings deployed for a landing approach to a short runway.

FIG. 17 is a cross sectional view of the compound wing taken on the line 17—17 in FIG. 16.

FIG. 18 is a cross sectional view of the compound wing taken on the line 18—18 in FIG. 16.

FIG. 19 is a plan view of a compound wing with the auxiliary wings deployed to stop the aircraft after touchdown on a short runway.

FIG. 20 is a cross sectional view of the compound wing taken on the line 20—20 in FIG. 19.

FIG. 21 is a cross sectional view of the compound wing taken on the line 21—21 in FIG. 19.

FIG. 22 is a plan view of a compound wing with the auxiliary wings deployed to extend the span of the compound wing for high altitude flight.

FIG. 23 is a cross sectional view of the compound wing taken on the line 23—23 in FIG. 22.

FIG. 24 is a cross sectional view of the compound wing taken on the line 24—24 in FIG. 22.

FIG. 25 is a side view of a cross section of a compound wing illustrating one arrangement for deploying an auxiliary wing with respect to the main wing.

FIG. 26 is a partial front view of the apparatus for deploying an auxiliary wing with respect to the main wing taken on the line 26—26 in FIG. 25.

FIG. 27 is a side view of a compound wing which may be rotated about the transverse axis of an aircraft fuselage.

FIG. 28 is a cross sectional view of a compound wing showing auxiliary wings which may be housed inside of a main wing.

FIG. 29 illustrates another embodiment of a compound wing where the auxiliary wings may be housed inside of a main wing.

FIG. 30 is a plan view of a compound wing which may employ inflatable auxiliary wings.

FIG. 31 is a cross sectional view taken on the line 31—31 in FIG. 30 illustrating a deflated auxiliary wing housed on the outer surface of the main wing.

FIG. 32 is a view taken on the line 32—32 in FIG. 30 showing in cross section a deployed auxiliary wing which is inflated.

DESCRIPTION OF THE PREFERRED EMBODIMENTS

Figure 14:
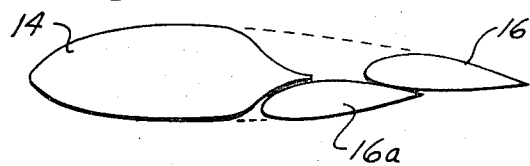
FIG. 14 is a cross sectional view of the compound wing taken on the line 14—14 in FIG. 13.

Reference is made to FIG. 1 which illustrates an aircraft with a compound wing constructed according to this invention. The aircraft includes a fuselage 10 with a nose portion 12. A compound wing on the right of the fuselage is composed of a main wing 14 and auxiliary wings 16 and 18. A compound wing on the left of the fuselage is composed of a main wing 20 and auxiliary wings 22 and 24.

FIG. 2 is a cross sectional view taken on the line 2—2 in FIG. 1 illustrating auxiliary wings housed on the outer contoured surface of a main wing. A main spar 30, in the form of an I-beam, may be disposed in the main wing 14 from wing root to wing tip for structural support. An auxiliary spar 32 similarly is disposed in the leading portion of the wing 14 for structural support. Stiffeners, hydraulic equipment, wing tanks and the like which might be present in a cross sectional view of an airplane wing are omitted in FIG. 2 in the interest of simplicity. A main spar 34 and an auxiliary spar 36 are disposed in the auxiliary wing 16 for structural purposes. Disposed below the auxiliary wing 16 is an auxiliary wing 16a which is not visible in FIG. 1. The auxiliary wing 16a includes a main spar 38 and an auxiliary 48 for structural purposes. Not shown in the auxiliary wings 16 and 16a in FIG. 2 are stiffeners which may be required for structural purposes to provide lateral strength in the auxiliary wings, optional equipment such as tanks for storing gas, and hydraulic equipment for controlling the auxiliary wings. Struts for deploying the auxiliary wings with respect to the main wing are omitted in FIGS. 1 through 25 in the interest of simplicity. The struts are described more fully hereinafter.

Reference is made next to FIG. 3 which is a rear elevation view taken on the line 3—3 in FIG. 1. The auxiliary wings 16 and 16a in FIG. 3 are disposed in the nested position as illustrated in cross section in FIG. 2. The auxiliary wing 18 in FIG. 1 is disposed over an auxiliary wing 18a which is shown in FIG. 3. The main wing 14 in FIG. 3 is thickest near the fuselage 10, and it diminishes in thickness toward the tip of the wing. The main wing 14 is widest near the fuselage 10 as shown in FIG. 1, and the width of the wing 14 diminishes toward the tip. The auxiliary wing 16 in FIG. 1 is widest at the end near the fuselage 10, and it diminishes in width toward its outboard edge. The auxiliary wing 18 is widest at its inboard edge, and its width diminishes toward the outboard edge. The thickness of the auxiliary wing 16 is greatest near the fuselage as shown in FIG. 3, and its thickness diminishes toward the outboard edge. The auxiliary wing 18 in FIG. 3 is thickest at its inboard edge, and the thickness diminishes toward the outboard edge. The thickness of the auxiliary wing 16 need not be the same as that of the auxiliary wing 16a. It may be preferable to have the auxiliary wing 16 on the top of the main wing 14 somewhat thicker than the lower auxiliary wing 16a to provide a better aerodynamic contour of the compound wing shown as in cross section in FIG. 2. Likewise, the thickness of the auxiliary wing 18 need not be the same as that of the auxiliary wing 18a, but the thicker of the two auxiliary wings should be on top of the main wing 14 as shown in FIG. 3 to provide a better aerodynamic contour as explained above. The width and the length of the auxiliary wing 16a is same as that of the auxiliary wing 16, and the length and width of the auxiliary wing 18a is the same as that of the auxiliary wing 18. However, it is not essential that such dimension be identical.

The thickness, length, and width of the main wing 20 in FIG. 1 is identical to that of the main wing 14. The length, width, and thickness of the auxiliary wings 22 and 24 in FIG. 1 are identical to the length, width, and thickness of respective auxiliary wings 16 and 18. Auxiliary wings 22a and 24a, not seen in FIG. 1, are disposed below respective auxiliary wings 22 and 24, and they have the same width, length, and thickness of respective auxiliary wings 16a and 18a in FIG. 3. It is essential for aerodynamic stability that the airfoils on the left side of the fuselage be identical in dimension as the companion airfoils on the right side of the fuselage.

The dotted line 51 in FIG. 2 represents the chord of the main wing 14. The dotted line 52 represents the chord of the auxiliary wing 16, and the dotted line 53 represents the chord of the auxiliary wing 16a. The main wing 14 has a greater portion of its thickness disposed above the chord line 51 thereby to provide aerodynamic lift during flight. The auxiliary wing 16 has a greater portion of its thickness disposed above the chord 52 likewise to provide aerodynamic lift when it is deployed. The auxiliary wing 16a has a greater portion of its thickness disposed above the chord 53 thereby to provide aerodynamic lift when it is deployed in flight. The extended main wing as shown by the dotted line 54 in FIG. 2 depicts the manner in which the main wing 14 normally is constructed when auxiliary wings 16 and 16a are not included. It is well known that approximately 90 percent of the lift of a conventional wing is provided by the forward half of the wing. In a conventional wing approximately 90 percent of the lift is provided by that portion of the main wing 14 to the left of the dotted line 55 in FIG. 2. It follows that approximately 10 percent of the lift of a conventional wing is provided by the trailing half of a conventional wing depicted by the dotted line 54 in FIG. 2 which lies to the right of the dotted line 55. It is seen, therefore, that the auxiliary wings 16 and 16a in FIG. 2 need provide but 10 percent of the lift of a conventional wing in order for the compound wing to provide a lift equal to that of the conventional wing. The trailing half of a conventional wing serves the functions of (1) minimizing drag, providing storage space for fuel, and providing support or housing for control devices such as ailerons, flaps, speed brakes and the like. The drag created by a conventional wing may be described as comprising two types; (1) drag created by the frontal area of a wing perpendicular to the flight path and (2) drag created by the skin of a wing which varies as a function of the surface area of a wing. The compound wing in FIG. 2 minimizes both types of drag because the total surface area of the compound wing is reduced, and the chord of the compound wing is shortened. The chord of the compound wing is illustrated by the line 56 in FIG. 2. The amount that the chord of the compound wing is reduced over the chord of a conventional wing is illustrated by the line 57. Since the width of the compound wing is shortened, it is readily seen that the total surface area of this wing is reduced over that of a conventional wing. Thus the drag of the compound wing is less than that of a conventional wing it replaces.

The deployment configuration of the compound wing in FIG. 1 is used for cruising speeds, and the compound wing then has its minimum chord. This configuration is used for normal cruising speed and for all higher cruising speeds up to and including maximum flight speed of the aircraft.

Reference is made next to FIG. 4 which is a plan view of the main wing 14 in FIG. 1 with the auxiliary wings deployed for climbing from or gliding to a short runway. FIG. 5 is a cross sectional view taken on the line 5—5 in FIG. 4. FIG. 6 is a cross sectional view taken on the line 6—6 in FIG. 4. The auxiliary wings 16 and 16a are deployed with respect to the main wing 14 as shown in FIG. 5 with the auxiliary wing 16 positioned above and rearwardly of the main wing 14 to provide lift and the auxiliary wing 16a positioned below, behind and at an angle with respect to the main wing 14 to provide lift. The auxiliary wing 16a is positioned below, behind and at an angle with respect to the main wing 14 to provide lift. The auxiliary wing 16a has greatly increased lift and more than its normal drag because it is disposed at an angle with respect to the main wing 14. The auxiliary wing 18 is deployed above and rearwardly of the main wing 14, and the auxiliary wing 18a is deployed below and behind the main wing 14. The auxiliary wing 18a provides greatly increased lift and above normal drag because it is disposed at an angle with respect to the main wing. The auxiliary wings 16 and 18 are disposed substantially parallel to the main wing 14, and they provide optimum lift with minimum drag.

The left wing 20 in FIG. 1 has its corresponding auxiliary wings deployed in like fashion to provide aerodynamic balance. More specifically, the auxiliary wing 22 in FIG. 1 is deployed in the same manner as the auxiliary wing 16 in FIG. 1 to prevent yaw and roll during straight flight; the auxiliary wings 18 and 24 in FIG. 1 are deployed in the same manner with respect to the respective main wings 14 and 20 to prevent yaw and roll during straight flight; and the auxiliary wings 16a and 22a and the auxiliary wings 18a and 24a are deployed symmetrically with respect to associated main wings 14 and 20 to prevent yaw and roll during straight flight.

If the auxiliary wings 22, 22a and 24, 24a of the main wing 20 are deployed to be symmetrical with the deployment of the auxiliary wings 16,16a and 18, 18a of the main wing 14 as illustrated in FIGS. 4 through 6, the aircraft can climb as rapidly as possible and at as steep an angle as possible with respect to the ground as available power permits. Increasing the angle of the auxiliary wings 16a, 18a and 22a, 24a results in a steeper angle of climb with a consequent loss in forward speed with respect to the air mass in which the craft flies. The deployment of the compound wings in the manner illustrated in FIGS. 4 through 6 permits an aircraft to takeoff and become airborne with a minimum of runway. This configuration is employed for a short takeoff or landing (STOL) aircraft. The same deployment of the compound wings shown in FIGS. 4 through 6 is employed for high angles of descent when approaching a runway.

Reference is made next to FIG. 7 which is a plan view of the wing 14 in FIG. 1. FIG. 7 illustrates the deployment of the auxiliary wings with respect to the main wing for takeoff during the time that an aircraft is on the runway. FIG. 8 is a cross sectional view taken on the line 8—8 in FIG. 7 showing the deployment of the auxiliary wings 16 and 16a with respect to the main wing 14 when rolling down the runway during takeoff.

FIG. 9 is a cross sectional view taken on the line 9—9 in FIG. 7 showing the deployment of the auxiliary wings 18 and 18a with respect to the main wing 14 when rolling down the runway during takeoff. The auxiliary wings 22, 22a and 24, 24a of the main wing 20 in FIG. 1 are deployed in the same manner as respective auxiliary wings 16,16a and 18, 18a are deployed with respect to the main wing 14 in FIGS. 7 through 9 during takeoff from a runway. The auxiliary wing 16 in FIG. 8 is disposed above and parallel to the main wing 14, and the auxiliary wing 16a is disposed at an angle with respect to the main wing 14 as shown. The auxiliary wing 18 is disposed over, forward, and at an angle with respect to the main wing 14 as shown in FIG. 9. The auxiliary wing 18a is disposed aft, below, and at an angle with respect to the main wing 14 as shown in FIG. 9.

The disposition of the auxiliary wings with respect to the main wings, as shown in FIGS. 7 through 9, is particularly desirable for takeoff as a STOL aircraft using minimum runway. A Venturi effect is created between the auxiliary wing 16 and the main wing 14 when they are disposed as shown in FIG. 8, and the Venturi effect per se provides additional lift, and permits a high angle of attack. The auxiliary wing 16a is disposed at an angle with respect to the main wing 14, as shown in FIG. 8, to assist in provided optimum angle of climb of the airplane immediately upon leaving the runway. The compound wing elements deployed as illustrated in FIG. 8 provide optimum lift for takeoff. The outboard auxiliary wings 18 and 18a are disposed with respect to the main wing 14 as shown in FIG. 9 during takeoff to provide optimum lift. The auxiliary wing 18 serves as a slat to provide a slot effect which gives extra lift and increased angle of attack. The auxiliary wing 18a in FIG. 9 is disposed at the same angle with respect to the main wing 14 as the auxiliary wing 16a, and it serves the same function. Thus it is seen that configuration in FIGS. 7 through 9 is especially suitable for takeoff using minimum runway.

Reference is made next to FIGS. 10 through 12 for a configuration of the compound wing useful during takeoff of an aircraft from a long runway where a small initial angle of climb is used. FIG. 10 is a plan view of the compound wing showing the manner in which the auxiliary wings 16,16a and 18, 18a are deployed with respect to the main wing 14. FIG. 11 is a cross sectional view taken on the line 11—11 in FIG. 10. FIG. 12 is a cross sectional view taken on the line 12—12 in FIG. 10. The auxiliary wings 22, 22a and 24, 24a are deployed with respect to the main wing 20 in FIG. 1 in the same manner as corresponding auxiliary wings 16, 16a and 18, 18a are disposed with respect to the wing 14 in FIG. 10. The auxiliary wing 16 in FIG. 11 is deployed as shown to extend the chord of the compound wing during takeoff, and the auxiliary wing 16a is deployed as shown to provide sufficient lift and the desired initial climb angle and angle of attack of the aircraft. The auxiliary wings 18 and 18a in FIG. 12 are deployed as shown to extend the chord of the outer portion of the compound wing during takeoff. The same deployment of the compound wing may be employed for landing an aircraft where a long runway is used. In this case a low angle of descent is used to approach the runway where a complete runout throughout the length of the long runway is permissible.

Figure 13:
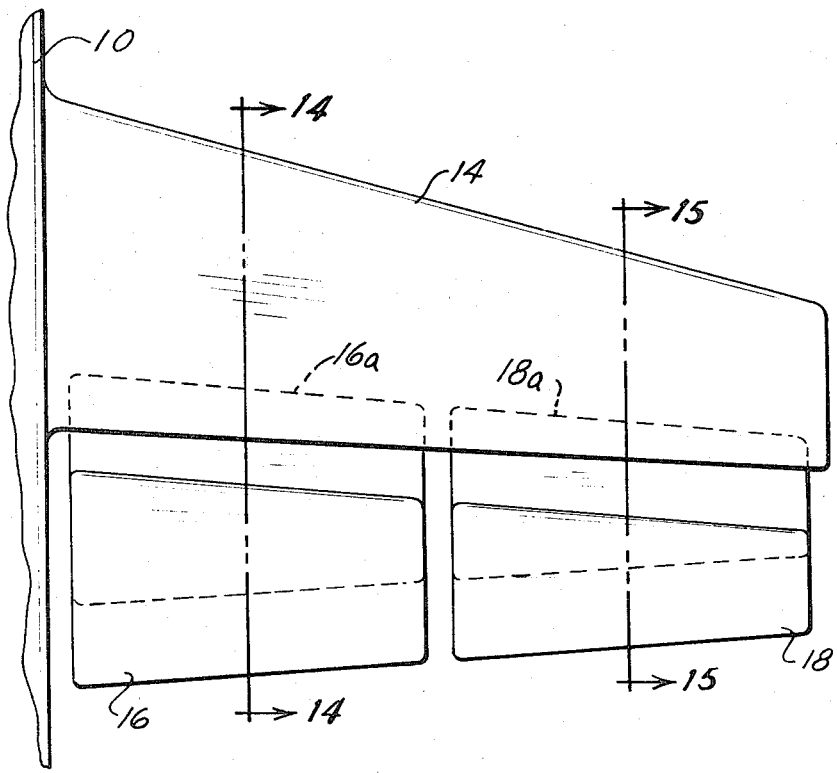
FIG. 13 is a plan view of a compound wing with the auxiliary wings deployed for long climbs, long glides, or holding patterns.
Figure 15:
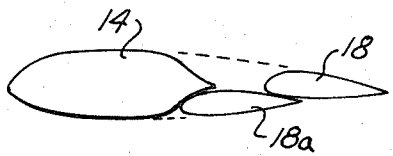
FIG. 15 is a cross sectional view of the compound wing taken on the line 15—15 in FIG. 13.

Reference is made next to FIGS. 13 through 15 for an illustration of the manner in which a compound wing is deployed for (1) cruising in level flight for maximum endurance, (2) flying a holding pattern for maximum endurance, or (3) making a long climb or a long glide. FIG. 13 is a plan view showing the deployment of the auxiliary wings 16,16a and 18, 18a with respect to the main wing 14. FIG. 14 is a cross sectional view taken on the line 14—14 in FIG. 13. FIG. 15 is a cross sectional view taken on the line 15—15 in FIG. 13. The lower auxiliary wings 16a in FIG. 14 and 18a in FIG. 15 are deployed as shown engaging the lower aft portion of the main wing 14. The upper auxiliary wings 16 in FIG. 14 and 18 in FIG. 15 are disposed behind the main wing 14 in engagement with respective lower auxiliary wings 16a and 18a. This deployment of the compound wing increases the effective chord of the compound wing. This configuration of the compound wing provides for an optimum ratio of lift to drag for a minimum throttle setting during a long climbout to a higher altitude or a long glide to a lower altitude. The same configuration may be employed for maximum endurance when either cruising or holding at any altitude. That is, cruising or a holding pattern at any altitude is executed using minimum fuel consumption.

Reference is made next to FIGS. 16 through 18 which shows a configuration of a compound wing used for a high angle approach to land on a short runway. FIG. 16 is a plan view of the compound wing showing the deployment of the auxiliary wings with respect to the main wing for such a landing approach. FIG. 17 is a cross sectional view taken on the line 17—17 of FIG. 16 which illustrates the deployment of the auxiliary wings 16 and 16a with respect to the main wing 14. FIG. 18 is a cross sectional view taken on the line 18—18 in FIG. 16 showing the deployment of the auxiliary wings 18–18a with respect to the main wing 14. The auxiliary wing 16 in FIG. 17 is disposed behind and at an angle with respect to the main wing 14. A Venturi effect is created between the auxiliary wing 16 and the main wing 14. The auxiliary wing 16a in FIG. 17 is disposed behind and at a greater angle with respect to the main wing 14 than the auxiliary wing 16. The auxiliary wing 16a provides drag. The auxiliary wings 16 and 16a in combination provide a greater Venturi effect behind the main wing 14, and also they direct a downwash flow of air behind the main wing 14. The downwash provides for an even greater lift capability of the compound wing. The auxiliary wings 18 and 18a in FIG. 18 are positioned with respect to the main wing 14 in the same manner that the auxiliary wings 16 and 16a are positioned with respect to the main wing 14, and they perform the identical function for the outboard portion of the main wing 14. The auxiliary wings 22, 22a, 24 and 24a of the left wing 20 in FIG. 1 are disposed in the same manner as the corresponding auxiliary wings 16,16a and 18,18a are deployed with respect to the main wing 14 in FIGS. 16 through 18. This deployment of the auxiliary wings with respect to the main wings is used to fly the airplane to the point of touchdown on the runway from a high angle of approach.

Reference is made to FIGS. 19 through 21 which illustrate a compound wing configuration for stopping an aircraft after touchdown on a short runway from a high angle of approach. FIG. 19 is a plan view of the compound wing. FIG. 20 is a cross sectional view taken on the line 20—20 in FIG. 19, and FIG. 21 is a cross sectional view taken on the line 21—21 in FIG. 19.

The auxiliary wings 16a in FIG. 20 and 18a in FIG. 21 are disposed in the same manner as illustrated in respective FIGS. 17 and 18 for a high angle of approach to a short runway. The auxiliary wings 16 in FIG. 20 and 18 in FIG. 21 are rotated from the positions shown in respective FIGS. 17 and 18 to the positions shown in respective FIGS. 20 and 21. This rotation of the auxiliary wings 16 and 18 takes place immediately on touchdown of the aircraft on the runway. With the auxiliary wings 16 and 16a disposed as shown in FIG. 20 and the auxiliary wings 18 and 18a disposed as shown in FIGS. 21, at or immediately after touchdown, the net lift capability of the compound wing is destroyed, and the drag of the compound wing is increased to a maximum. The aircraft may be brought to a halt on a short runway with the additional assistance of brakes, reverse thrust, or other braking devices.

Reference is made next to FIGS. 22 through 24 for an illustration of the manner in which a compound wing is deployed for flight of an aircraft at extremely high altitude. FIG. 22 is a plan view of the compound wing 14. FIG. 23 is a cross sectional view taken on the line 23—23 of FIG. 22, and FIG. 24 is a cross sectional view taken on the line 24—24 of FIG. 22. The auxiliary wings 16 and 16a are deployed as shown with respect to the main wing 14 to provide maximum chord length for the inboard portion of the compound wing. The auxiliary wings 18 and 18in FIGS. 22 and 24 are disposed as shown with respect to the main wing 14 to provide optimum lift for the outboard portion of the compound wing. The upper outboard auxiliary wing 18 is disposed behind the main wing 14 as illustrated in FIG. 24 to increase the chord length of the outboard portion of the compound wing. The lower outboard auxiliary wing 18a is disposed beneath the main wing 14 as shown in FIG. 24, and it extends beyond the main wing 14 as shown in FIG. 22. The auxiliary wing 18a serves to extend the effective length of the compound wing. The configuration of the compound wing in FIGS. 22 through 24 represents the right wing of the aircraft in FIG. 1, and the left compound wing in FIG. 1 is deployed in like fashion. That is, the auxiliary wings 22, 22a and 24, 24a are deployed in a manner identical to that of the auxiliary wings 16, 16a and 18, 18a of the right compound wing shown in FIGS. 22 through 24. An aircraft having this configuration of the compound wing provides maximum lift which is needed by an aircraft for flight at extremely high altitudes.

It is pointed out that the positions of the auxiliary wings with respect to the main wings in FIGS. 1 through 24 are relative, and such positions will vary in degree with flight conditions, load, and different types of wings in aircraft construction.

By way of summary it is also pointed out further that the Venturi effect between the auxiliary wings and the main wing is particularly useful to provide a high angle of attack especially for takeoff and landing.

Struts for connecting the auxiliary wings to the main wings have been omitted in FIGS. 1 through 24 in the interest of simplicity. One suitable strut arrangement is described next.

Reference is made to FIGS. 25 and 26 for an illustration of one manner of adjustably positioning an auxiliary wing with reference to a main wing. FIG. 25 is a side view of a cross section of a compound wing, and FIG. 26 is a partial front view of the apparatus in FIG. 25 taken on the line 26—26. Referring first to FIG. 25, an auxiliary wing 101 is adjustably secured in various positions with respect to a main wing 102 by a telescoping strut 103 which is hydraulically operated. The strut 103 is pivotally connected by a bracket 104 to a rotatable platform 105. The platform 105 is secured by a pedestal 106 to a sturdy structural member of the main wing 102. In a similar fashion the strut 103 is pivotally secured by a bracket 107 to a rotatable platform 108. The platform 108 in turn is secured by a pedestal 109 to a structural member of the auxiliary wing 101. A slot 110 is provided in the auxiliary wing 101 to permit movement of the strut 103. A similar slot 111 is provided in the main wing 102 which permits movement of the strut 103. The slots 110 and 111 preferably are covered with a sliding surface member, not shown, which moves with the strut 103 and reduces air turbulence.

Reference is made next to FIG. 26 which is an enlarged front view taken on the line 26—26 in FIG. 25. A power train, not shown in FIG. 25 in the interest of simplicity, is included in FIG. 26. The strut 103 in FIG. 26 is secured to a shaft 121, and this shaft is supported by the brackets 104 and 104a. An electric motor 122 is energized to operate a gear train 123 which in turn rotates the shaft 121. As this motor is operated it varies the angle between the strut 103 and the chord of the main wing 102 in FIG. 25. The strut 103 is operated by hydraulic means, not shown, to extend or retract the strut. This selectively varies the distance that the auxiliary wing 101 is positioned from the main wing 102. The auxiliary wing 101 in FIG. 25 has a power train, not shown, similar to that in FIG. 26 which permits adjustment of the angle between the strut 103 and the chord of the auxiliary wing 101.

A motor 131 in FIG. 26 operates a gear train 132 which rotates the platform 105. The platform 105 has gear teeth which mesh with the gear train 132. This power train is used whenever it is desired to deploy the auxiliary wing 101 laterally along the main wing 102. If the auxiliary wing 101 is to be deployed laterally along the main wing 102, the motor 122 in FIG. 26 first is energized to operate the gear train 123 and thereby position the strut 103 to the vertical position shown by the phantom lines in FIG. 25. The devices in auxiliary wing are simultaneously operated, keeping auxiliary wing 101 aligned in the airstream. The strut 103 then is in alignment with a slot 112 which runs transversely of the main wing 102 and a slot 113 which runs transversely of the auxiliary wing 101. These slots likewise are preferably covered by slideable surface members not shown to reduce air turbulence. Once the strut 103 is vertically aligned with the slot 112, the electric motor 131 is energized to operate the gear train 132 and rotate the platform 105 through an angle of 90°. Rotation may be in the clockwise or counterclockwise direction. The platform 108 in the auxiliary wing 101 is rotated 90° in the opposite direction simultaneously as the platform 105 in the main wing is rotated. After this rotation of the platforms 105 in the main wing and 108 in the auxiliary wing is finished, the strut 103 in FIG. 25 occupies the position illustrated by the phantom lines in FIG. 25. The angle of the strut 103 with respect to the platform 105 is then adjusted by energizing the motor 122 in FIG. 26 which in turn operates the gear train 123 to rotate the shaft 121 to the desired angle. Simultaneously as this adjustment is made in the main wing a power train not shown in the auxiliary wing 101 is operated to change the angle of the strut 103 with respect to the platform 108 as the auxiliary wing 101 moves laterally along the main wing 102. The strut 103 moves along the slot 113 as the auxiliary wing 101 moves laterally with respect to the main wing 102. The length of the strut 103 may be increased or decreased, as desired, to control the distance of the auxiliary wing 103 from the platform 105 of the main wing 102.

Two or more struts of the type shown in FIG. 25 may preferably be employed with each auxiliary wing for the purpose of rigidity. Whenever an adjustment is made in the angle of the strut with respect to the auxiliary wing or the main wing, these changes should be made with simultaneous adjustments taking place in both the auxiliary wing and the main wing. Unless these adjustments are made simultaneously, unnecessary stresses may be created in the struts or the mounting assemblies in the auxiliary wing and the main wing. As pointed out above the slots 110, 111, 112, and 113 preferably are covered with a slideable auxiliary skin in order to minimize aerodynamic turbulence and drag. The auxiliary wing 101 may be positioned laterally in an inboard direction or an outboard direction along the main wing. Although FIGS. 25 and 26 illustrate a strut arrangement and power train for selectively positioning each upper auxiliary wing with respect to the main wing, a similar strut arrangement and power train is provided for each lower auxiliary wing which thereby may be selectively positioned in the fore and aft and vertical directions, as well as laterally with respect to a main wing. It is pointed out further that the deployment of the auxiliary wings with respect to the right main wing is the same as the deployment of the auxiliary wings with respect to the left main wing.

Reference is made next to FIG. 27 for an illustration of a tilt-wing aircraft which employs a compound wing. A main wing 151 is rotatable with respect to a fuselage 152. Upper auxiliary wings 153, 154 and lower auxiliary wings 155, 156 are deployed as shown. A thrust device such as a jet engine 157 is secured to the wing 151. The position of the auxiliary wings with respect to the main wing, as shown, is merely illustrative, and it does not necessarily depict disposition for a particular flight requirement. The compound wing on the opposite side of the fuselage 152 has corresponding auxiliary wings deployed in identical fashion. The tilt wing 151 is rotated to desired positions with respect to the fuselage 152 to obtain desired lift or drag. The auxiliary wings may be deployed to provide additional lift as needed.

The ability to rotate the compound wing in FIG. 27 is highly desirable for takeoff from and landing on a short runway, especially when jet engines are mounted on the main wings. For a short field takeoff the compound wing is disposed horizontally as the aircraft accelerates along the runway, and as soon as the aircraft reaches flight speed, the compound wing is rotated to elevate the leading edge of the main wing at which time the aircraft begins a steep climb from the runway. By directing the jet engine thrust downwardly the vertical lift vector is increased, and if the auxiliary wings are disposed with respect to the main wing to create the Venturi effect, described above, the vertical lift vector is further increased. If the auxiliary wings are positioned to direct the Venturi discharge downwardly, the downwash provides an additional increase of the vertical lift vector. One or more of the auxiliary wings may be deployed to extend the chord of the compound wing thereby to increase the vertical lift vector. Once the aircraft reaches the desired altitude from a steep climb, it may be transitioned to more horizontal flight by progressive stages in which the auxiliary wings are deployed to progressively increase the horizontal flight vector while at the same time decreasing the vertical lift vector.

The tilt wing aircraft in FIG. 27 may be employed as a VTOL aircraft. In this event the jet engines attached to the compound wing may be employed to provide the necessary vertical thrust for a vertical takeoff. Alternatively, other jet engines not shown may be employed alone or in combination with the wing mounted engines to provide necessary vertical thrust for a vertical takeoff. In any event the auxiliary wings are useful in making the transition from vertical flight to horizontal flight. For this purpose the auxiliary wings are deployed to provide lift as the aircraft acquires a horizontal component of velocity. The deployment of the auxiliary wings may be changed in successive stages during the transition from vertical flight to horizontal flight of the aircraft. It is pointed out that during the phase of vertical flight only the main wing is substantially ineffective as an air foil, and it is not until substantial horizontal velocity is acquired that the main wing becomes effective as an air foil to provide lift. Therebefore, with some horizontal velocity, the main wing only creates drag. As the horizontal component of velocity of the aircraft increases during the transition from vertical flight from horizontal flight, the horizontal component of velocity of the aircraft causes the main wing to provide progressively increasing lift. The rotatable wings on the other hand, become effective as lift devices when the transition is first made from vertical to horizontal flight, and this is the most critical portion of a vertical takeoff flight. Thrust must be transferred slowly to the horizontal flight phase without loss of altitude where low power engines are used. The first advantage of a compound wing over a monowing aircraft is this. A multiplicity of angles of attack may be assumed by the various wings of a compound wing throughout the transition without the high inherent drag of a monoplane. A monoplane used as a VTOL aircraft with the wing disposed vertically for takeoff creates very high drag in response to the horizontal component of velocity during the transition from vertical flight to horizontal flight. As the horizontal velocity increases, the drag increases, and this continues until sufficient horizontal velocity is acquired to permit rotation of the wing to a low angle of attack for horizontal flight. Furthermore, this requires a relatively high expenditure of fuel which in turn results in greater air pollution, and the transition time from vertical flight to horizontal flight is relatively long in duration which extends noise pollution. The compound wing aircraft substantially reduces the fuel requirements and correspondingly reduces the transition time, air pollution, and noise pollution.

A second advantage of the compound wing aircraft is its ability to maintain the wing mounted engine 157 in FIG. 27 at or near a vertical attitude for a longer period of time during a vertical takeoff, thereby insuring the proper vertical thrust vector when the auxiliary wings are deployed to the best advantage while increasing the horizontal thrust vector. The advantages enumerated above for a vertical takeoff are equally valid for a vertical landing.

Third, rotation of the compound wing upwardly with respect of the fuselage during high angle climbing from a takeoff and high angle descending to a landing serves to increase passenger and pilot comfort because G forces are minimized. Reduction of G forces reduces the stress on cargo and the airplane structure. Furthermore, pilot vision is increased by maintaining the fuselage substantially horizontal.

Fourth, a tiltable compound wing reduces the length of the landing gear assemblies for many aircraft types which heretofore required relatively long landing gear assemblies necessary to permit a nose-up attitude during landing or takeoff. In this connection it is pointed out that certain types of airplanes which require a nose-up attitude for takeoff and landing must have long landing gear assemblies to permit elevation of the nose without dragging the tail on the runway. By maintaining the fuselage substantially horizontal during landing and takeoff, as permitted by the tiltable compound wing, the landing gear assemblies may be shortened thereby reducing their complexity and weight and hence their cost. Weight reduction improves the flight characteristics of the aircraft. Moreover, shortened landing gear permits easier access and egress to and from the aircraft when on the ground with the resultant benefit of reducing the cost of ramps and other airport facilities including repair and maintenance facilities.

Fifth, if the compound wing is rotated with the leading edge down when on the ground, the jet exhaust is directed upwardly, and passengers and cargo may be loaded or unloaded at an airport without shutting down the engines. Also, adjustments and maintenance procedures may be made on the engines thus positioned while they are running. With the tail of the jet engine directed upwardly easy access is permitted by maintenance personnel to make the necessary adjustments without requiring ladders provided the engines are mounted near the leading edge of the compound wing.

Sixth, when turbojet aircraft are started up and operated on the ground, rotating the tail cone upward to any selected degree provides for abatement of noise as well as dispersion of gasses and solid emissions. Such noise abatement considerably reduces the expense of airport construction, the annoyance to airport customers and environmental neighbors, and improves the working conditions of airport, airline and vendor employees. The use of afterburners on jet engines, in addition to elevating the tail cone of the jet engines, reduces or substantially eliminates obnoxious gasses and burns up solid emissions. Thus pollution of all types is vastly reduced at the ground level around airports where the concentration is normally very high.

The tiltable compound wing provides additional antipollution benefits. Modern aircraft particularly turbo jet powered ones, emit considerable noise, gas, smoke, and particle pollutants. By rotating the compound wing to direct engine exhaust downwardly, as during takeoff or landing and approaches for takeoff and landing, the cone of adversely directed noise and exhaust emissions can be minimized instead of blanketing large areas with emissions. The primary emission area of a symmetrical exhaust cone of 90° from a jet engine exhaust, depressed 45° from the horizontal for instance, has a radius on the ground only equal to the altitude of the aircraft. Further depression of the engine exhaust from the horizontal to 60° reduces the radius on the ground to just three-fourths of the altitude. The noise emissions from an aircraft near the ground are concentrated into a controllable area, it is seen, and as the exhaust of the engine is rotated downwardly toward the vertical, the area of noise pollution on the ground is further reduced thereby sparing the nearby population of excessive noise. Secondary noise emissions from the compressor section forward in the engine thus flow harmlessly skyward.

The deployment of a tiltable compound wing to provide maximum lift during landing and takeoff reduces power consumption thereby minimizing the emission of gas, smoke, particles, and noise into the atmosphere surrounding an airport. Such pollution is minimized enroute between airports by use of a compound wing since it provides superior lift capabilities over the conventional fixed purpose type wing thereby reducing fuel consumption which in turn reduces pollutants.

The short takeoff or landing characteristics provided an aircraft by a compound wing plus the vertical takeoff or landing characteristics of a tiltable compound wing permit relatively large aircraft to land on and takeoff from vessels off shore. This removes the noise, gas, smoke, and particle pollution away from populated areas, and feeder aircraft then may distribute passengers to their ultimate destinations. By ferrying passengers and cargo to scattered destinations in aircraft using compound wings the various types of pollution are minimized as well as distributed. In some cases passengers may be ferried from the off shore vessels to shore destinations by water borne vessels thereby further reducing pollution.

Reference is made next to FIG. 28 which is a cross sectional view illustrating a modified arrangement of a compound wing. Auxiliary wings 201 and 202 may be housed within the main wing 203. A lower door 204, shown slightly open, permits ingress and egress of the auxiliary wing 201. An upper door 205, shown in the closed position, permits ingress and egress of the upper auxiliary wing 202. Members 206 and 207 may be housed within the main wing, and they serve as fairings when deployed. The fairing member 206 is shown housed in the main wing 203. The fairing member 207 is shown deployed to engage the upper auxiliary wing 202 when it is deployed to the position shown in phantom lines. When deployed in this fashion, the upper fairing member 207 fills the gap between the main wing 203 and the auxiliary wing 202 thereby to reduce turbulence and increase lift. The upper auxiliary wing 202 selectively may be deployed in a number of positions in engagement with the fairing member 207. If the lower auxiliary wing 201 is deployed to the dotted line position shown, the lower fairing member 206 may be extended to cover the gap between the main wing 203 and the auxiliary wing 201. The auxiliary wing 201 may be selectively deployed in any one of many positions in engagement with the lower fairing member 206. If the lower auxiliary wing 201 and the upper auxiliary wing 202 are deployed to the dotted line positions shown, in engagement with respective fairing members 206 and 207, the compound wing in FIG. 28 has a long chord.

The after portion of the main wing 203, it is pointed out, is truncated, or shortened, when compared to a normal aircraft wing. The after portion of the main wing 203 may be truncated with a nominal loss in lift because, as pointed out above, ninety percent of the lift provided by a normal aircraft wing is obtained from the forward half of the wing. Alternatively, the main wing 203 may be truncated with the after surface having an inverted curvature as shown by the dotted lines 203a. The inverted truncation shown by the dotted line 203a in FIG. 28 is the type of main wing employed in the various embodiments of the compound wing used in the aircraft of FIG. 1. The fairing members 206 and 207 may be employed to minimize drag in the compound wing of FIGS. 1 through 24.

The auxiliary wings may be housed in a normal wing of an aircraft. Reference is made next to FIG. 29 which illustrates in cross section a normal wing 241 with auxiliary wings 242 and 243 housed therein. Doors 244 and 245 provide for ingress and egress of the respective auxiliary wings 242 and 243. In this case the auxiliary wings 242 and 243 may be deployed, for example, to provide additional lift where it may be needed for short takeoff or landing purposes.

Reference is made next to FIG. 30 which is a plan view of the right wing of an aircraft which is provided with inflatable auxiliary wings. A fuselage 301 is connected to a normal wing 302 that is provided with deflatable auxiliary wings 303 and 304. The auxiliary wing 303 is shown inflated and deployed. The auxiliary wing 304 is shown deflated and nested to the normal wing 302. FIG. 31 is an expanded cross sectional view taken on the line 31—31 in FIG. 30 which illustrates the manner in which the auxiliary wing 304 is housed when deflated. FIG. 32 is an expanded cross sectional view taken on the line 32—32 in FIG. 30 which illustrates the auxiliary wing 303 inflated and deployed. When deflated, the auxiliary wings 303 and 304 are disposed in nesting sites on the normal wing 302, and the nesting sites may be depressions in the normal wing. The auxiliary wing 303 is disposed in the nesting site 305 in FIG. 30 when deflated and housed in the normal wing 302. When the auxiliary wings 303 and 304 are deflated and housed, the normal wing 302 has its usual contour as illustrated in FIG. 31 by the auxiliary wing 304. When the auxiliary wings 303 and 304 are inflated and deployed, the nesting sites are depressed areas, but very little if any turbulence is created because of their smooth contour. The main wing 302 may be truncated or not, as desired.

The main wing structures in various ones of FIGS. 1 through 32 may include flaps, aileron, speed brakes, and trim tabs which are not shown in the interest of simplicity.

A three-dimensional model of a compound wing according to this invention was tested in a wind tunnel, and positive lift coefficients in excess of unity were obtained with a range of attack angles from 3° through 9° in airspeeds having a range of 150 feet per second to 265 feet per second. With lift-over-drag ratios exceeding 8:1 over these ranges, the compound wing demonstrated a high rate of climb, a high rate of descent, several economical cruising attitudes, low jet fuel consumption rates in flight holding patterns at low altitudes, and a slightly negative pitching moment. Sharp changes in the lift and drag characteristics of the compound wing were obtained with changes of the gap distance between the auxiliary wing and the main wing as little as 7 percent of the main wing chord. It was found that effective Venturi slots were created between the main wing and the auxiliary wing with many different attitudes of the auxiliary wing with respect to the main wing. It was determined from test results that ratios of main wing and auxiliary wing dimensions and ratios of main wing span to auxiliary wing span, main wing chord to auxiliary wing chord, and main wing thickness to auxiliary wing thickness may be selected to provide aircraft with different capabilities. Also, the diverging or converging angles between the chord of an auxiliary wing and the chord of a main wing may be predetermined to obtain given aerodynamic characteristics in flight. It can be stated in conclusion that mathematical models may be derived for designing various classes of aircraft having optimum parameters for its assigned functions.

It is seen, therefore, that a novel compound wing is provided according to this invention which permits selectively varying the chord and span. Lift may be increased or diminished in flight, with excellent relation to drag, at the discretion of the pilot, to permit the aircraft to serve multiple roles. The pilot may deploy the auxiliary wings of a compound wing to obtain economies in fuel consumption, higher altitudes, and high angles of descent to or climb from a runway; transition from vertical flight to horizontal flight can be made rapidly and efficiently. These can be accomplished while at the same time reducing noise pollution and air pollution. The versatility thus provided an aircraft increases air safety. Additional lift selectively may be employed to permit slow speed landings thereby increasing airport safety. In fact, multiple low speed aircraft landings at existing airports may take place simultaneously with a high degree of safety. The versatile compound wing of VTOL aircraft permits the critical transition from vertical to horizontal flight to be made rapidly, efficiently, and safely while at the same time minimizing fuel consumption and reducing noise and air pollution in and around airports. A compound wing structure according to this invention eliminates the after portion of a conventional wing thereby minimizing cost and weight of wing construction. Further weight reduction of an aircraft results from the use of smaller and lighter landing gear assemblies. The overall weight reduction thus obtained reduces the power plant requirement to propel the aircraft thereby further minimizing costs. The extra lift provided by a compound wing further decreases power requirements. The net results of the compound wing is to provide a versatile aircraft which immeasureably improves available options in the choice of payload, speed, altitude, endurance, and other parameters of a flight.

While the invention has been particularly shown and described with reference to preferred embodiments thereof, it will be understood by those skilled in the art that various changes in form and details may be made therein without departing from the spirit and scope of the invention.

What is claimed is:

1. An aircraft having a fuselage, a compound wing attached to the fuselage and extending outwardly on each side of the fuselage, each side of the compound wing including:
    a main wing which provides lift in response to airflow thereacross, an auxiliary wing means which responds to airflow thereacross to provide lift, and positioning means securing the auxiliary wing to the main wing, said positioning means including further means for placing the auxiliary wing at any attitude and for universally positioning the auxiliary wing in three dimensions at any one of a plurality of positions with respect to the main wing.

2. The apparatus of claim 1 wherein the main wing includes a door for each auxiliary wing for permitting the associated auxiliary wing to pass through the door and be housed in the main wing or to pass out of the door to be deployed in the air stream.

3. The apparatus of claim 2 wherein the main wing includes a fairing member disposed therein which selectively is deployed outside of the main wing in engagement with the auxiliary wing to reduce turbulence whenever the auxiliary wing is disposed nearby and outside of the main wing.

4. The apparatus of claim 1 wherein the after portion of the main wing is truncated and includes an upper after surface which has a concave curvature, a lower after surface which has a convex curvature, and said upper and lower after surfaces coming together at the trailing edge of the main wing.

5. An aircraft having a fuselage, a compound wing connected to the fuselage, said compound wing extending outwardly an equal distance on each side of the fuselage, each side of said compound wing including:
    a main wing having a convex outer surface on the upper and lower forward portion thereof, said convex surfaces meeting at the forward leading edge of the main wing, said main wing having a concave outer surface on the upper and lower after portions thereof, said concave surfaces meeting at the trailing edge of the main wing
    an auxiliary wing having an upper convex outer surface and a lower convex outer surface, said upper and lower convex outer surfaces meeting each other at the leading and trailing edges of the auxiliary wing, and
    positioning means mounting the auxiliary wing to the main wing for universally positioning the auxiliary wing in three dimensions at any one of a plurality of positions with respect to the main wing and at any selected attitude.

6. The apparatus of claim 5 wherein means is connected to the fuselage and the compound wing for rotating the main wing about a transverse axis of the aircraft.

7. The apparatus of claim 5 wherein the positioning means includes a strut which is adjustable in length, first means connecting the strut to the main wing for varying the angle of the strut with respect to the main wing, and second means connecting the strut to the auxiliary wing for varying the angle of the auxiliary wing with respect to the strut.

8. The apparatus of claim 7 wherein each side of the compound wing includes a plurality of auxiliary wings, and said positioning means connects each auxiliary wing to the main wing.

9. The apparatus of claim 8 wherein the plurality of auxiliary wings are arranged in pairs with one auxiliary wing of each pair disposed on the top of the main wing, and the other auxiliary wing of each pair being disposed below the main wing.

10. The apparatus of claim 9 wherein the auxiliary wings are collapsible.

11. An aircraft having a fuselage, a compound wing connected to the fuselage and extending outwardly on each side of the fuselage, each outwardly extending portion of the compound wing including:
    a main wing which provides lift in response to airflow thereacross, the after portion of said main wing being truncated, an auxiliary wing which responds to airflow thereacross to provide lift, and positioning means, said positioning means securing the auxiliary wing to the main wing, said positioning means including first means for positioning the auxiliary wing in three dimensions at any one of a plurality of positions relative to the main wing and second means for placing the auxiliary wing in any selected attitude, said auxiliary wing having a contour which mates with the truncated portion of the main wing whenever the positioning means is operated to nest the auxiliary wing in the truncated portion of the main wing.

12. The apparatus of claim 11 wherein the truncated after portion of the main wing has an upper surface which has a concave curvature and a lower surface which has a concave curvature, and said concave surfaces come together at the trailing edge of the main wing.

13. An aircraft having a fuselage, a compound wing connected to the fuselage, said compound wing having a right wing portion extending on the right side of the fuselage and a left wing portion extending on the left side of the fuselage, said right and left wing portions each responding to airflow thereacross to provide lift, a first auxiliary wing which responds to airflow thereacross to provide lift, first means connecting the first auxiliary wing to the right wing portion, said first means including second means for positioning the first auxiliary wing in three dimensions at any one of a plurality of selected positions with respect to the right wing portion and at any selected attitude, a second auxiliary wing which responds to airflow thereacross to provide lift, and third means connecting the second auxiliary wing to the left wing portion, said third means including fourth means for positioning the second auxiliary wing in three dimensions at any one of a plurality of selected positions with respect to the left wing portion and at any selected attitude.

14. The apparatus of claim 13 including two or more auxiliary wings connected to the right wing portion by the first means, and two or more auxiliary wings connected to the left wing portion by said third means, the total number of auxiliary wings connected to the right wing portion being equal to the total number of auxiliary wings connected to the left wing portion.

15. The apparatus of claim 13 further including means connected to the left wing portion and right wing portion for rotating the left and right wing portions around a lateral axis of the aircraft.

16. A compound wing for an aircraft including:
a main wing which responds to airflow thereacross to provide lift,
a plurality of auxiliary wings each of which responds to airflow thereacross to provide lift, and
positioning means securing the main wing to the auxiliary wings said positioning means including first means for positioning each auxiliary wing in three dimensions to any one of a plurality of selected positions with respect to the main wing and second means for placing each auxiliary wing at any selected attitude.

17. The apparatus of calim 16 wherein the auxiliary wings are positioned by said positioning means rearwardly of the main wing to increase the effective chord length of the compound wing.

18. The apparatus of claim 16 wherein the auxiliary wings are positioned by the positioning means laterally of the main wing to increase the span of the compound wing.

19. A compound wing for an aircraft including:
a main wing which responds to airflow thereacross to provide lift,
an auxiliary wing which responds to airflow thereacross to provide lift, and
positioning means securing the main wing to the auxiliary wing, said positioning means including further means for positioning the auxiliary wing at any selected attitude and for positioning the auxiliary wing in three dimensions at any one of a plurality of positions aft of the main wing for varying the chord of the compound wing.

20. A compound wing having a variable span, said compound wing including:
a main wing which responds to airflow thereacross to provide lift,
an auxiliary wing which responds to airflow thereacross to provide lift, and
positioning means, said positioning means securing the main wing to the auxiliary wing, said positioning means including additional means for positioning the auxiliary wing at any selected attitude and for positioning the auxiliary wing laterally of the main wing in three dimensions to any one of a plurality of selected positions for varying the span of the compound wing.

21. A compound wing for an aircraft, said compound wing including:
a main wing which responds to airflow thereacross to provide lift,
an auxiliary wing which responds to airflow thereacross to provide lift,
positioning means connected between the main wing and the auxiliary wing for positioning the auxiliary wing in three dimensions to any one of a plurality of selected positions with respect to the main wing, and
said positioning means including a support member which may be varied in length, first means connected between the support member and the main wing for varying the angle between the support member and the main wing, and second means connected between the support member and the auxiliary wing for varying the angle between the support member and the auxiliary wing,
whereby the auxiliary wing may be deployed at a selected distance and at a given angle with respect to the main wing, and the angle of the auxiliary wing with respect to the support member may be varied thereby to change the attitude of the auxiliary wing.

22. An aircraft having a right compound wing and a left compound wing, each of said compound wings including:
a main wing having an upper convex outer surface and a lower convex surface, said upper and lower convex outer surfaces meeting each other at the leading and trailing edges of the main wing,
a plurality of pairs of auxiliary wings, each auxiliary wing having an upper convex outer surface and a lower convex outer surface, said upper and lower convex outer surfaces meeting each other at the leading and trailing edges of each auxiliary wing, each auxiliary wing responding to airflow thereacross to provide lift, and positioning means connecting each auxiliary wing to the main wing for universally positioning each auxiliary wing in three dimensions to any one of a plurality of positions with respect to the main wing, said positioning means including a support member which is adjustable in length, first means connecting the support member to the main wing for varying the angle of the support member with respect to the main wing, and second means connecting the support member to the auxiliary wing for varying the angle of the auxiliary wing with respect to the support member, the plurality of pairs of auxiliary wings being connected by the positioning means to the main wing with one auxiliary wing of each pair disposed directly behind or over the main wing and the other auxiliary wing of each pair disposed directly behind or beneath the main wing.

23. The apparatus of claim 22 wherein the main wing is truncated and the positioning means is operated to nest the pairs of auxiliary wings in the truncated portion of the main wing.

* * * * *